(12) United States Patent
Hudson

(10) Patent No.: US 6,865,139 B2
(45) Date of Patent: Mar. 8, 2005

(54) SUBSEA NAVIGATION AND SURVEY

(75) Inventor: Steven Martin Hudson, Dorset (GB)

(73) Assignee: Expro North Sea Limited, Reading (GB)

( * ) Notice: Subject to any disclaimer, the term of this patent is extended or adjusted under 35 U.S.C. 154(b) by 0 days.

(21) Appl. No.: 10/250,544

(22) PCT Filed: Dec. 20, 2001

(86) PCT No.: PCT/GB01/05684
§ 371 (c)(1),
(2), (4) Date: Jul. 2, 2003

(87) PCT Pub. No.: WO02/054110
PCT Pub. Date: Jul. 11, 2002

(65) Prior Publication Data
US 2004/0042342 A1 Mar. 4, 2004

(30) Foreign Application Priority Data
Jan. 3, 2001 (GB) .............................................. 0100106

(51) Int. Cl.[7] .............................................. H04B 11/00
(52) U.S. Cl. ..................................................... 367/131
(58) Field of Search ........................... 367/131; 342/22; 701/21

(56) References Cited

U.S. PATENT DOCUMENTS

| 3,511,206 A | 5/1970 | West, Jr. |
|---|---|---|
| 4,061,965 A | 12/1977 | Nelson |
| 4,799,825 A | 1/1989 | Meyerhoff et al. |
| 5,047,990 A | 9/1991 | Gafos et al. |
| 5,894,450 A | 4/1999 | Schmidt et al. |
| 2004/0042342 A1 * | 3/2004 | Hudson ...................... 367/131 |

FOREIGN PATENT DOCUMENTS

| FR | 2 737 026 A | | 1/1997 | |
|---|---|---|---|---|
| WO | WO 96/03662 A | | 8/1996 | |
| WO | WO-02054110 | * | 7/2002 | ............ G01V/1/38 |

OTHER PUBLICATIONS

International Search Report, mailed Apr. 4, 2002.

* cited by examiner

Primary Examiner—Daniel Pihulic
(74) Attorney, Agent, or Firm—Alston & Bird LLP

(57) ABSTRACT

A subsea navigation system comprising a plurality of spaced antenna means provided on a subsea structure arranged to emit electromagnetic radiation. A detection means is provided on a subsea vehicle for receiving and analyzing the electromagnetic radiation transmitted by the antenna means allowing the subsea vehicle to navigate relative to the subsea structure. Each of the antenna means comprises a cathodic protection anode provided on the subsea structure.

18 Claims, 1 Drawing Sheet

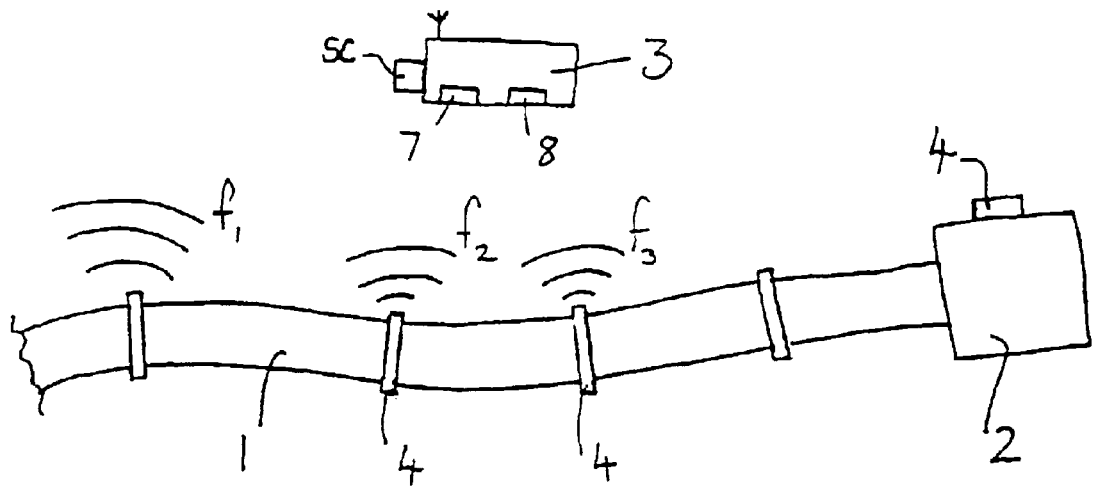
FIG. 1
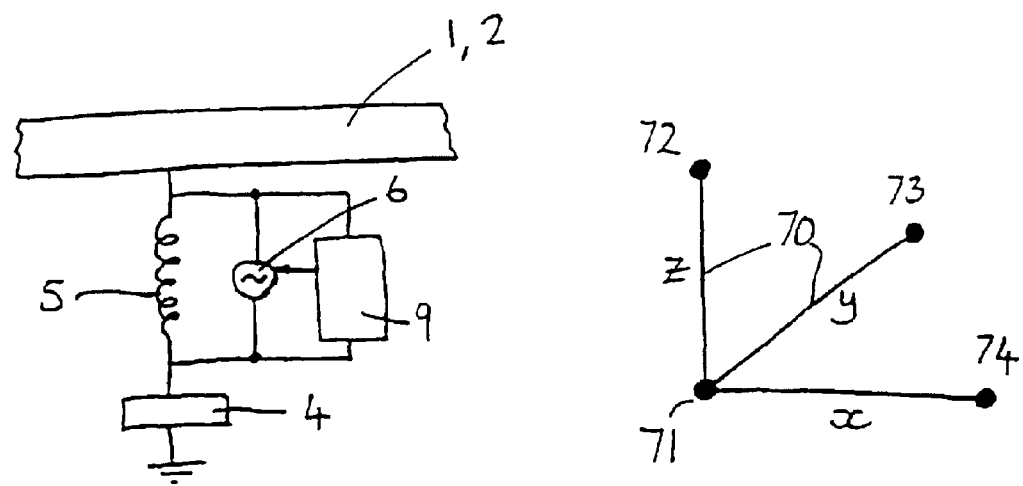
FIG. 2
FIG. 3

SUBSEA NAVIGATION AND SURVEY

BACKGROUND OF THE INVENTION

1. Field of the Invention

This invention relates to subsea navigation, for example following or tracking of subsea structures to facilitate inspection or other operations, it further relates to surveying the position of subsea structures.

2. Description of Related Art

Performing periodic inspection and/or maintenance is essential in the operation of subsea pipeline systems. There are two main ways in which this is currently conducted, i.e. by the use autonomous underwater vehicles (AUVs) or directly by divers.

The use of AUV's is preferred but problems still arise. For example, when carrying out an inspection, the AUV must be made to follow the appropriate subsea structure closely enough so that it can provide useful information. Typically, when inspections are being carried out, the AUV will include sonar scanning equipment to form images of the structure. With such equipment there is a trade off between resolution and field of view. Therefore, if the precise position of the structure is not known relative to the AUV, the equipment must be set up with a relatively large field of view and a correspondingly low resolution to ensure an image of the structure is obtained. In most circumstances, it is either undesirable or impossible for a human operator to monitor the position of an underwater vehicle relative to the subsea structure and hence AUV's are used which attempt to follow the structure autonomously.

Existing systems use inertial navigation equipment which does not operate perfectly. Thus the further an AUV is from its start point, the further off course it may have wandered. In practice this means that the array of sonar detectors provided on the AUV has to be configured to give a field of view sufficient to cope with the maximum deviation from course which might arise during the length of the scan. As mentioned above this leads to a reduction in resolution.

BRIEF SUMMARY OF THE INVENTION

It is an object of a main aspect of this invention to provide a navigation system which allows navigation relative to a subsea structure.

It is an object of another aspect of this invention to provide a subsea survey method.

According to a first aspect of the invention there is provided a method of subsea navigation comprising the steps of:
causing a plurality of spaced antenna means provided on a subsea structure to emit electromagnetic radiation; and
receiving and analyzing said radiation at a subsea vehicle to
  allow the subsea vehicle to navigate relative to the subsea structure.

According to a second aspect of the invention there is provided a subsea navigation system comprising a plurality of spaced antenna means provided on a subsea structure and arranged to emit electromagnetic radiation, and detection means provided on a subsea vehicle for receiving and analyzing electromagnetic radiation transmitted by the antenna means to allow a subsea vehicle to navigate relative to the subsea structure.

According to a third aspect of the invention there is provided apparatus for a subsea navigation system, the apparatus comprising a plurality of antenna means arranged to be mounted in a spaced relation on a subsea structure for emission of electromagnetic radiation, and detection means arranged for location on a subsea vehicle for receiving and analyzing electromagnetic radiation transmitted by the antenna means to allow the subsea vehicle to navigate relative to the subsea structure.

The term subsea is used in this application as this is conventional terminology, however it will be appreciated that the term subsea should be taken to include any underwater situation.

In some cases a common signal generating means may be provided for driving some or all of the antenna means. Preferably however, independent signal generating means are provided for each antenna means. Said apparatus may comprise signal generating means.

The system is typically arranged so that radiation from each antenna means can be received mutually independently to reduce or eliminate interference or confusion. This may be achieved in a number of different ways.

In some embodiments the radiation emitted by the individual antenna means is not mutually identical. It is particularly preferred if the radiation emitted by one antenna means is detectably different from that emitted by each adjacent antenna means. Using different frequencies is a preferred way to provide detectably different radiation.

In some embodiments three detectably different instances, typically three different frequencies, of radiation may be emitted.

The radiation may be emitted at differing times by each antenna means to aid or allow discrimination.

The system, apparatus or method may be arranged so that the emission of radiation from the antenna means is triggered by a signal issued from transmission means on the subsea vehicle. Such triggering may be selective.

The receiving means and analysing means may be arranged to perform 3 axis electric field detection. This allows the direction of a vector towards the source transmitting the radiation to be found.

The method, system and apparatus may be arranged to allow the subsea vehicle to track the subsea structure.

This invention is particularly applicable where the structure to be tracked is a pipeline system. In such cases the subsea vehicle will normally be an Autonomous Underwater Vehicle (AUV) which is being used to inspect or otherwise interact with the pipeline system.

The method, system and apparatus may be arranged such that the underwater vehicle is able to determine its position relative to the subsea structure. In some circumstances this would enable the underwater vehicle to determine its position absolutely relative to the Earth's surface. The analyzing means may be arranged to determine the position of the underwater vehicle relative to the subsea structure. This may be achieved using the results of 3 axis field detection and triangulation techniques.

A pipeline system typically comprises metallic structure which is provided with cathodic protection anodes. In such cases, the plurality of antenna means of the present method, system and apparatus may comprise a plurality of anodes, each anode acting as or as part of a respective antenna means. Anodes are located at convenient spaced locations along the structure, can function well as antennas, and, of course, are already present for other reasons. This makes the use of anodes in the antenna means particularly attractive.

The metallic structure of a pipeline system will generally comprise one or more flowline and possibly other structures such as manifolds, trees, and wellheads.

According to another aspect of the present invention there is provided a method for surveying the position of a subsea structure comprising the steps of:

monitoring the position of a subsea vehicle relative to a known reference point;

causing a plurality of spaced antenna means provided on the subsea structure to emit electromagnetic radiation;

causing the subsea vehicle to travel along the subsea structure; and analyzing said radiation as received at the subsea vehicle as it travels to allow the determination of the position of the subsea structure relative to the subsea vehicle and hence relative to said reference point.

BRIEF DESCRIPTION OF THE SEVERAL VIEWS OF THE DRAWING(S)

Embodiments of the present invention will now be described, by way of example only, with reference to the accompanying drawings in which:

FIG. 1 schematically shows part of a pipeline system and a nearby AUV;

FIG. 2 schematically shows an anode and a section of flowline in the pipeline system of FIG. 1; and FIG. 3 schematically shows a three axis electric field detecting means provided at the AUV shown in FIG. 1.

DETAILED DESCRIPTION OF THE INVENTION

FIG. 1 shows part of a pipeline system comprising a flowline 1 and a wellhead 2 as well as a nearby AUV 3 which is being used to inspect the pipeline system. The AUV 3 comprises appropriate sonar and/or other scanning equipment SC to allow the inspection and recording of the condition of the pipeline system.

The pipeline system is a metallic structure and is provided with a plurality of cathodic protection anodes 4 at spaced locations. Referring to FIG. 2, each anode 4 is connected to its respective portion of metallic structure 1, 2 via inductance means 5. Further, a respective transmitting means 6 is connected across each inductance means 5. The inductance means 5 is chosen to have virtually zero impedance to the cathodic protection currents which must pass through the anode, whilst having a high impedance to signals generated by the respective transmitting means 6. In this way it is possible for each anode 4 to act as an antenna when the transmitting means 6 is operated.

In operation, the metallic structure 1, 2 and earth, via the respective anode 4 and other remote earthing locations, act as a signal circuit. However, in the present application all that is important is that it is possible for the anode to radiate electromagnetic waves away from it and hence away from the metallic structure 1, 2.

The AUV 3 comprises detecting means 7 for receiving and analyzing the electric field caused by electromagnetic radiation emitted from the anodes 4.

The AUV 3 further comprises transmitting means 8 arranged to transmit trigger signals to receiving and control means 9 associated with each anode 4. Each receiving and control means 9 is arranged to cause operation of the respective transmitting means 6 upon receipt of an appropriate trigger signal from a nearby AUV 3.

In operation, the AUV 3 begins its inspection journey at a point nearby the pipeline system. The transmitting means 8 on the AUV 3 is caused to emit a trigger signal which is received by the receiving and control means 9 associated with nearby anodes 4. On receipt of this trigger signal, each receiving and control means 9 causes its respective transmitter means 6 to operate and thus cause its respective anode 4 to emit electromagnetic radiation.

It is important that the AUV 3 is able to receive signals from the individual anodes independently. Thus, some means must be provided to allow the signals to be distinguished. There are a number of ways in which this can be accomplished as will be evident to those skilled in the art.

In the present embodiment, the transmitting means 6 do not all transmit at the same frequency. In particular, three different frequencies $f_1$, $f_2$, $f_3$ are used. The transmitting means 6 are arranged so that each anode 4 emits radiation at a different frequency than its immediately adjacent neighbours.

The detecting means 7 in the AUV 3 receives and analyzes the radiation emitted from any nearby anodes 4 which are transmitting. The detecting means 7 comprises a three axis electric field detection means schematically shown in FIG. 3. The three axis detection means comprises a nonconductive frame 70 having three mutually perpendicular legs. A common electrode 71 is provided at the joining point of the legs and respective other electrodes 72, 73, 74 and provided at the end of each leg. A shielded conductor (not shown) is provided from each electrode 71–74 to the remainder of the detecting means 7. In use the relative potential between the common electrode 71 and each of the other electrodes 72–73 is measured in turn. As the legs are mutually orthogonal these measurements are representative of the x, y, z components of the detected field in the frame of reference determined by the legs and thus the direction towards the transmitting anode can be determined. Preferably the 3 axis detection means is allowed to float freely in the sea or is formed around the AUV 3. In one particular arrangement the AUV 3 is housed in a carbon fiber/KEVLAR® cage and parts of the cage act as the legs 70 between electrodes 71–74 provided on its corners.

The AUV 3 is arranged to use the determined directional information to control the path of the AUV 3 ensuring that it closely tracks the pipeline system and thus that the pipeline system remains within the field of view of the scanning equipment SC.

In the present embodiment the instantaneous position of the AUV 3 relative to the subsea structure is determined using standard trigonometric techniques. Although this is not essential for simple tracking, it gives greater flexibility in general navigation. Thus the present system can be used for general navigation purposes in the region of the structure.

The AUV 3 may have access to a map of the structure being followed or other data which can be used in determining a new heading. Such information may also be used to allow navigation relative to the Earth's surface when the position of the structure is known.

At a straight section of a pipeline, information concerning the directions to transmitting anodes may be insufficient to pinpoint the AUV 3 relative to the pipeline 1. For this reason a gravity sensor or vertical gyro may be used to provide additional information.

It is possible for the signals emitted by the anodes 4 to carry coded information which can be interpreted by the AUV 3. For example the coded information may include a unique address or location information to enable the AUV 3 to pinpoint its position along the pipeline structure. Other information, for example sensor readings, may be coded onto the signals emitted by the anodes 4. This clearly facilitates the collection of data from components and sensors associated with the subsea structure in addition to, or in alternative to, data/images obtained from the scanning equipment provided on the AUV 3.

Although not described in detail it is also possible for the AUV 3 to send signals to the pipeline 1, these might then be transmitted along the pipeline to a remote location.

The present embodiment makes use of electric signals of frequency up to 10 KHz. With such a system, the electric signals transmitted from the anodes 4 should have a range in the order of low hundreds of meters. In alternatives a two tier frequency regime can be used. Since low frequencies will travel further in water, a lower frequency might be used as an AUV 3 homes in, and once close to the pipeline a higher frequency could be used.

In some implementations, direct, and possibly real time, communication of the data obtained and processed by the AUV 3 may be made to a surface vessel. Such communication may be implemented in a number of different ways but preferably the AUV 3 has a tetherless mode of operation so any communication to the surface is preferably wireless.

It should be noted that this navigation system is not restricted to use with AUVs inspecting pipeline systems. On the contrary, it may be used with any subsea vehicle where there is a desire to navigate relative to a subsea structure.

In a development of the above system the AUV 3 and transmitting anodes 4 may be used to "survey in" a pipeline 1. In this case the position of the pipeline relative to the Earth's surface is unknown and is to be determined. The system described above is used to record the relative position of the pipeline 1 and the AUV 3 as the AUV 3 is moved along the pipeline 1. The position of the AUV 3 as it moves relative to Earth is monitored using sonar and GPS for example. The combination of knowing the "absolute" position of the AUV 3 and the position of the AUV 3 relative to the pipeline 1 enables the "absolute" position of the pipeline to be mapped.

What is claimed is:

1. A subsea navigation system comprising a plurality of spaced antennas provided on a subsea structure and arranged to emit electromagnetic radiation, and a detector provided on a subsea vehicle for receiving and analyzing electromagnetic radiation transmitted by the antennas to allow the subsea vehicle to navigate relative to the subsea structure, wherein each antenna comprises a respective cathodic protection anode provided on the subsea structure.

2. A subsea navigation system according to claim 1 in which an independent signal generator is provided for driving each antenna.

3. A subsea navigation system according to claim 1 which is arranged so that radiation from each antenna is receivable substantially mutually independently.

4. A subsea navigation system according to claim 3 in which the radiation emitted by one antenna is detectably different from that emitted by each adjacent antenna.

5. A subsea navigation system according to claim 1 which is arranged so that the emission of radiation from each antenna is triggered by a signal issued from a transmitter on the subsea vehicle.

6. A subsea navigation system according to claim 5 in which the triggering is selective so as to actuate only at least one selected antenna.

7. A subsea navigation system according to claim 1 in which the detector is arranged to perform 3 axis electric field detection enabling determination of the direction of a vector towards the source transmitting the radiation.

8. A subsea navigation system according to claim 7 in which the detector comprises a three axis detector comprising a non-conductive frame, a common electrode and three other electrodes spaced from the common electrode in respective mutually perpendicular directions.

9. A subsea navigation system according to claim 8 in which the frame has three mutually perpendicular legs, the common electrode is provided at the joining point of the legs and each other electrode is provided at the end of a respective leg.

10. A subsea navigation system according to claim 8 in which the subsea vehicle is housed in a cage made at least of carbon fiber and parts of the cage act as the non-conductive frame.

11. A method of subsea navigation comprising the steps of:
    causing a plurality of spaced antennas provided on a subsea structure to emit electromagnetic radiation, each antenna comprising a respective cathodic protection anode provided on the subsea structure; and
    receiving and analyzing said radiation at a subsea vehicle to allow the subsea vehicle to navigate relative to the subsea structure.

12. Apparatus for a subsea navigation system, the apparatus comprising a plurality of antennas arranged to be mounted in a spaced relation on a subsea structure for emission of electromagnetic radiation, and a detector arranged for location on a subsea vehicle for receiving and analyzing electromagnetic radiation transmitted by the antennas to allow the subsea vehicle to navigate relative to the subsea structure, wherein each antenna comprises a respective cathodic protection anode.

13. A system according to claim 1 which allows the subsea vehicle to track the subsea structure.

14. A method for surveying the position of a subsea structure comprising the steps of:
    monitoring the position of a subsea vehicle relative to a known reference point;
    causing a plurality of spaced antennas provided on the subsea structure to emit electromagnetic radiation, each antenna comprising a respective cathodic protection anode;
    causing the subsea vehicle to travel along the subsea structure; and
    analyzing said radiation as received at the subsea vehicle as it travels to allow the determination of the position of the subsea structure relative to the subsea vehicle and hence relative to said reference point.

15. A method according to claim 11 which allows the subsea vehicle to track the subsea structure.

16. Apparatus according to claim 12 which allows the subsea vehicle to track the subsea structure.

17. A subsea navigation system comprising a plurality of spaced antenna means provided on a subsea structure and arranged to emit electromagnetic radiation, and detection means provided on a subsea vehicle for receiving and analyzing electromagnetic radiation transmitted by the antenna means to allow the subsea vehicle to navigate relative to the subsea structure, wherein each antenna means comprises a respective cathodic protection anode provided on the subsea structure.

18. A method of subsea navigation comprising the steps of:
    causing a plurality of spaced antenna means provided on a subsea structure to emit electromagnetic radiation, each antenna means comprising a respective cathodic protection anode provided on the subsea structure; and
    receiving and analyzing said radiation at a subsea vehicle to allow the subsea vehicle to navigate relative to the subsea structure.

* * * * *